US012440711B2

(12) United States Patent
Sawada et al.

(10) Patent No.: US 12,440,711 B2
(45) Date of Patent: Oct. 14, 2025

(54) SYSTEM FOR CONFIRMING HOOKING STATE OF SAFETY HARNESS

(71) Applicant: YOSHIKAWA KOGYO CO., LTD., Fukuoka (JP)

(72) Inventors: Kikuzo Sawada, Fukuoka (JP); Shinya Harano, Fukuoka (JP)

(73) Assignee: YOSHIKAWA KOGYO CO., LTD., Fukuoka (JP)

( * ) Notice: Subject to any disclaimer, the term of this patent is extended or adjusted under 35 U.S.C. 154(b) by 622 days.

(21) Appl. No.: 17/801,311

(22) PCT Filed: Mar. 29, 2021

(86) PCT No.: PCT/JP2021/013239

§ 371 (c)(1),
(2) Date: Aug. 22, 2022

(87) PCT Pub. No.: WO2021/210374

PCT Pub. Date: Oct. 21, 2021

(65) Prior Publication Data

US 2023/0084097 A1 Mar. 16, 2023

(30) Foreign Application Priority Data

Apr. 13, 2020 (JP) ................................ 2020-071878

(51) Int. Cl.
*A62B 35/00* (2006.01)

(52) U.S. Cl.
CPC ...... *A62B 35/0075* (2013.01); *A62B 35/0037* (2013.01); *A62B 35/0043* (2013.01); *A62B 35/0093* (2013.01)

(58) Field of Classification Search
CPC ........... A62B 35/0075; A62B 35/0093; A62B 35/0025; A62B 35/0037; A62B 35/0043
(Continued)

(56) References Cited

U.S. PATENT DOCUMENTS 5,744,953 A * 4/1998 Hansen .................. G06F 3/011
324/207.17
6,868,941 B1 * 3/2005 Hermann .......... A62B 35/0037
182/18
(Continued)

FOREIGN PATENT DOCUMENTS

JP 3034078 U 2/1997
JP H11-267237 A 10/1999
(Continued)

OTHER PUBLICATIONS

International Preliminary Report on Patentability, dated Oct. 13, 2022, with Written Opinion for PCT/JP2021/013239.
(Continued)

*Primary Examiner* — Brent W Herring
(74) *Attorney, Agent, or Firm* — Fleit Intellectual Property Law; Paul D. Bianco

(57) ABSTRACT

Provided is a new technique capable of determining whether or not a hook of a safety harness is used correctly, without causing complexity in the configurations of the hook and a safety rope. Specifically, provided is a system for confirming a hooking state of a safety harness, wherein a safety harness 10 comprises: a belt 11 to be worn on a body of a worker; a safety rope 12 connected to the belt 11; a hook 13 attached to a distal end of the safety rope 12; and a hook holder 14 for allowing the hook 13 to be attached to the belt 11 therethrough. The system is operable to detect whether or not the hook 13 is attached to the hook holder 14, and issue a warning when it is detected that the hook 13 is attached to the hook holder 14.

1 Claim, 3 Drawing Sheets

(58) Field of Classification Search
USPC .......................................................... 182/231
See application file for complete search history.

(56) References Cited

U.S. PATENT DOCUMENTS

| | | | | | |
|---|---|---|---|---|---|
| 8,232,888 | B2 * | 7/2012 | Frederick | B60Q 9/008 | 119/721 |
| 2009/0256715 | A1 * | 10/2009 | Frederick | G08B 21/0213 | 335/298 |
| 2009/0322512 | A1 * | 12/2009 | Frederick | F16P 3/145 | 340/539.11 |
| 2010/0231402 | A1 * | 9/2010 | Flynt | G08B 19/00 | 340/679 |
| 2010/0271214 | A1 * | 10/2010 | Frederick | G08B 21/182 | 340/600 |
| 2011/0090079 | A1 * | 4/2011 | Morino | A62B 35/0075 | 340/532 |
| 2014/0361903 | A1 * | 12/2014 | Sawada | G08B 21/18 | 340/686.6 |
| 2020/0222732 | A1 * | 7/2020 | Rutkowski | A62B 35/0037 | |
| 2020/0282244 | A1 * | 9/2020 | Florence | G01L 5/047 | |
| 2021/0358282 | A1 * | 11/2021 | Lin | G08B 21/0461 | |

FOREIGN PATENT DOCUMENTS

| | | | |
|---|---|---|---|
| JP | 3079999 | U | 9/2001 |
| JP | 3194445 | U | 11/2014 |
| JP | 2019005425 | A | 1/2019 |
| JP | 202006111 | A | 1/2020 |

OTHER PUBLICATIONS

International Search Report dated May 12, 2021, and Written Opinion, for PCT/JP2021/013239, filed Mar. 29, 2021.

* cited by examiner

SYSTEM FOR CONFIRMING HOOKING STATE OF SAFETY HARNESS

TECHNICAL FIELD

The present invention relates to a system for confirming a hooking state of a safety harness to determine whether or not the safety harness is used correctly.

BACKGROUND ART

When working in high places such as construction sites, any worker is obliged to wear a safety harness for fall-prevention. Such a safety harness comprises a belt to be worn on the body of a worker, a safety rope connected to the belt, a hook attached to a distal end of the safety rope, and a hook holder for allowing the hook to be attached to the belt therethrough. The worker secures safety when working in a high place by wearing the belt on the body and hooking the hook to a main rope or the like installed in a high-place work area.

Meanwhile, in order to reliably prevent fall accidents, it is necessary for a worker to use the safety harness correctly. Particularly, in view of concern that a worker can forget to hook the hook to the main rope or the like in a high-place work area, there have heretofore been proposed a number of systems configured to detect whether or not the hook is hooked to the main rope or the like, and issue a warning when it is detected that the hook is not hooked to the main rope or the like.

For example, the below-mentioned Patent Document 1 discloses a system comprising a coil, detection means to detect whether or not an electromotive force is generated in the coil due to a change in magnetic flux, warning means, and control means operable, when it does not receive, from the detection means, any detection signal indicating the presence of generation of an electromotive force, to output a warning instruction signal to the warning means.

However, the technique disclosed in the Patent Document 1 needs to incorporate the coil in the hook of the safety harness, and incorporate, in the safety rope, an electric signal cable connecting the coil to the detection means and the warning means. Thus, the technique of the Patent Document 1 has a problem that the hook and the safety rope become complicated in terms of their configurations, leading to deterioration in durability.

CITATION LIST

Patent Document

Patent Document 1: JP-A H11-267237

SUMMARY OF INVENTION

Technical Problem

A technical problem to be solved by the present invention is to provide a new technique capable of determining whether or not a hook of a safety harness is used correctly, without causing complexity in the configurations of the hook and a safety rope.

Solution to Technical Problem

In conventional techniques, whether or not the hook of the safety harness is used correctly has been determined by detecting whether or not the hook is hooked to the main rope or the like. For this reason, the configurations of the hook and the safety rope inevitably become complicated.

The present inventors have changed viewpoint such that whether or not the hook of the safety harness is used correctly is determined by detecting whether or not the hook is attached to the hook holder of the safety harness, instead of detecting whether or not the hook is hooked to the main rope or the like. Specifically, when the hook is attached to the hook holder, it can be determined that the hook is not used correctly. Here, even when the hook is not attached to the hook holder, there is a possibility that the hook is not used correctly (the hook is not hooked to the main rope or the like). That is, a worker can leave the hook detached from the hook holder, without hooking the detached hook to the main rope or the like. However, if the hook detached from the hook holder is left as-is, the hook and the safety rope will hinder the work. Thus, it is unlikely that the worker leaves the hook detached from the hook holder. Therefore, no practical problem arises even if whether or not the hook of the safety harness is used correctly is determined depending on whether or not the hook is attached to the hook holder of the safety harness.

The present invention has been conceived based on the above technical idea, and the subject matter thereof is as follows.

1. A system for confirming a hooking state of a safety harness, wherein the safety harness comprises: a belt to be worn on a body of a worker; a safety rope connected to the belt; a hook attached to a distal end of the safety rope; and a hook holder for allowing the hook to be attached to the belt therethrough, the system being operable to detect whether or not the hook is attached to the hook holder, and issue a warning when it is detected that the hook is attached to the hook holder.
2. The system set forth in the section 1, which comprises, as means to detect whether or not the hook is attached to the hook holder: a magnet mounted to the hook; and a sensor installed adjacent to the hook holder to serve as means to detect a magnetism of the magnet.
3. The system set forth in the section 1, which comprises, as means to detect whether or not the hook is attached to the hook holder: a current supply to supply a minute electric current to the hook holder, and a sensor installed adjacent to the hook holder to serve as means to detect the current.
4. The system set forth in any one of the sections 1 to 3, which is configured such that means to define a high-place work area is installed in a work site, and means to detect whether or not the safety harness is located within the high-place work area is installed in the safety harness, wherein the system is operable to issue the warning only when it is detected that the safety harness is located within the high-place work area.
5. The system set forth in the section 4, wherein the means to define a high-place work area is configured to define the high-place work area by an AC induced magnetic field.

Effect of Invention

A technical problem to be solved by the present invention is to provide a new technique capable of determining whether or not a hook of a safety harness is used correctly, without causing complexity in the configurations of the hook and a safety rope.

DESCRIPTION OF EMBODIMENTS

Figure 1:
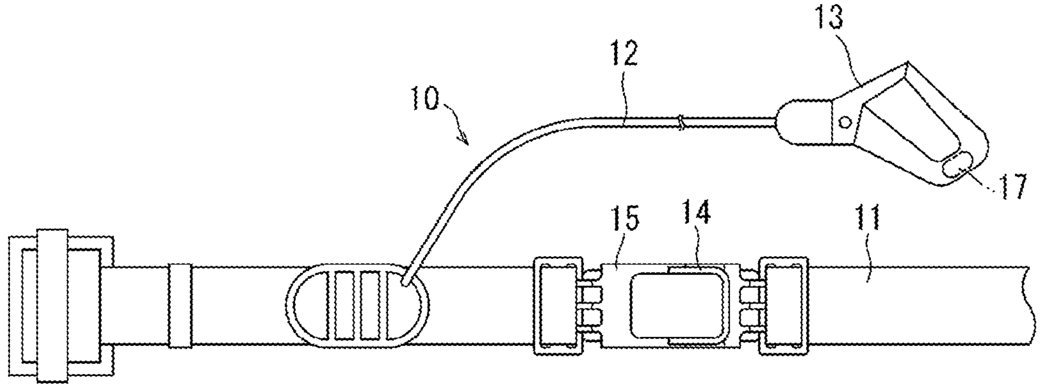
FIG. 1 is a schematic diagram of a safety harness constituting a safety harness hooking state confirmation system according to one embodiment of the present invention.
Figure 2:
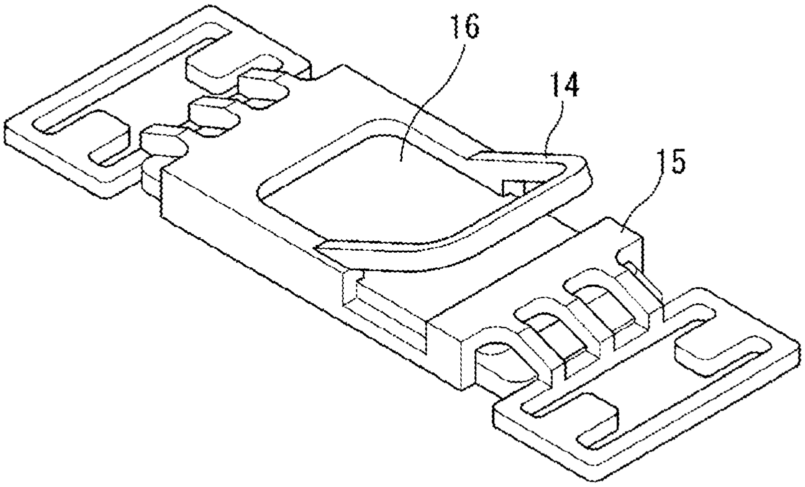
FIG. 2 is a perspective view of a hook holder section in the safety harness in FIG. 1.

FIG. 1 shows a safety harness 10 constituting a safety harness hooking state confirmation system according to one embodiment of the present invention. The safety harness 10 comprises: a belt 11 to be worn on the body of a worker; a safety rope 12 connected to the belt 11; a hook 13 attached to a distal end of the safety rope 12; and a hook holder 14 for allowing the hook 13 to be attached to the belt 11 therethrough. In this embodiment, the hook holder 14 is formed in a hook holder section 15 to which a tag 16 is mounted as shown in FIG. 2. Further, in this embodiment, a magnet 17 is mounted to the hook 13.

Figure 3:
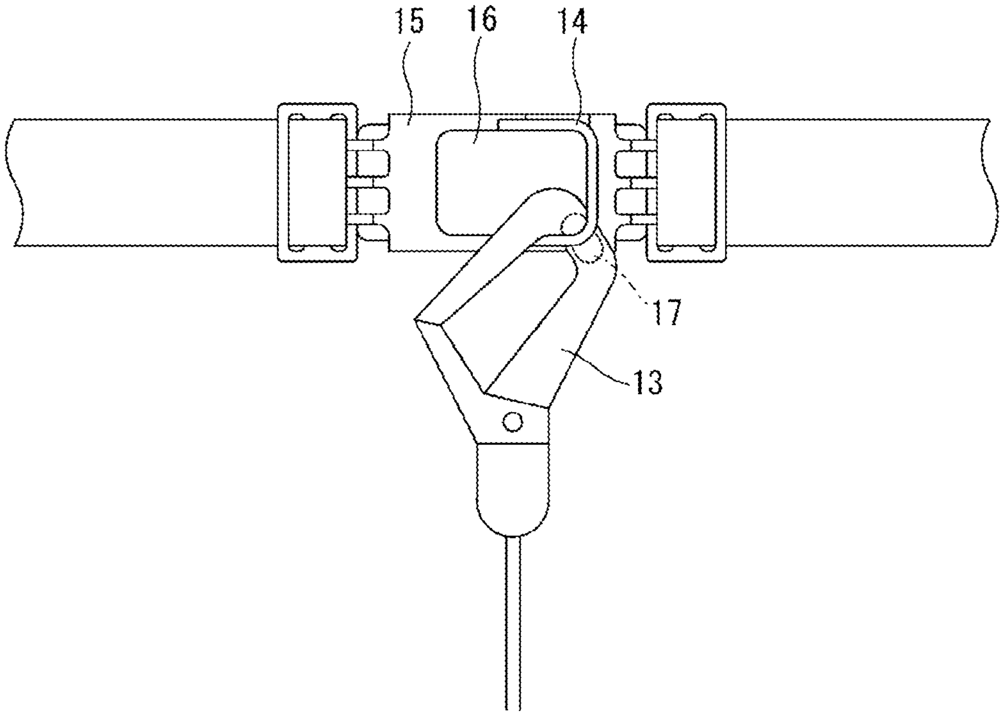
FIG. 3 is a perspective view of a relevant part showing a state in which a hook of the safety harness in FIG. 1 is attached to a hook holder.

As shown in FIG. 3, normally (before use), the hook 13 is attached (hung) to the hook holder 14. Here, the magnet 17 is mounted to the hook 13 such that in the state in which the hook 13 is attached to the hook holder 14, the magnet 17 is located adjacent to the hook holder 14.

Figure 4:
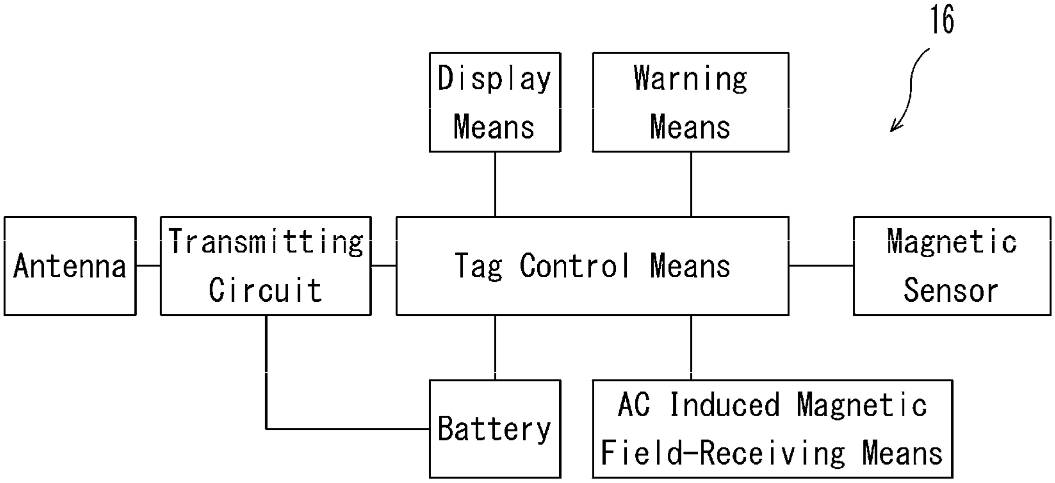
FIG. 4 is a block diagram showing the configuration of a tag mounted to the hook holder section of the safety harness in FIG. 1.
Figure 5:
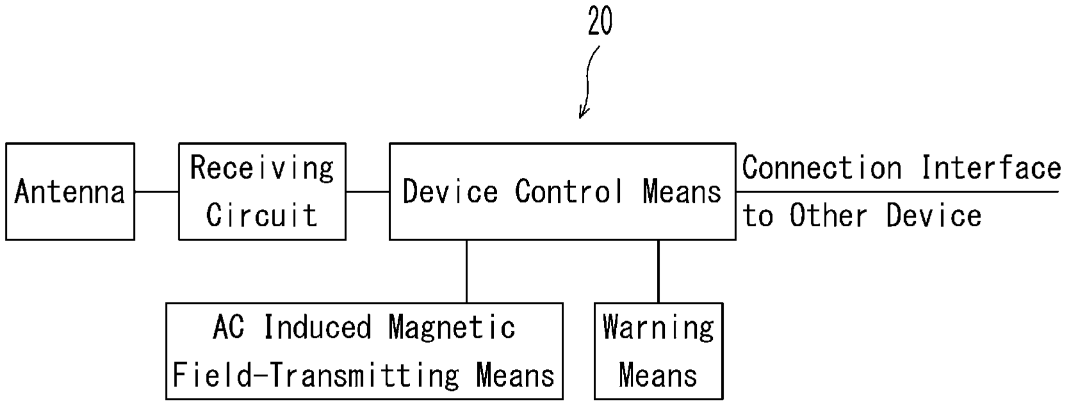
FIG. 5 is a block diagram showing the configuration of a control device constituting the safety harness hooking state confirmation system according to this embodiment.

FIG. 4 is a block diagram showing the configuration of the tag 16. The safety harness hooking state confirmation system according to this embodiment further comprises a control device 20 installed in a high-place work area. FIG. 5 is a block diagram showing the configuration of the control device 20.

The tag 16 comprises: a magnetic sensor installed adjacent to the hook holder 14 to serve as means to detect a magnetism of the magnet 17; warning means, display means, AC induced magnetic field-receiving means, a transmitting circuit, an antenna, tag control means to control the above components, and a battery. The tag control means is operable, when the magnetic sensor detects a magnetism, to determine that the hook 13 is attached to the hook holder 14, and output a warning signal.

On the other hand, the control device 20 is installed in a high-place work area to mainly serve as means to define the high-place work area, and comprises AC induced magnetic field-transmitting means for defining the high-place work area by an AC induced magnetic field. Specifically, the AC induced magnetic field transmitting means transmits an AC induced magnetic field to cover the high-place work area. Then, when the AC induced magnetic field is received by the AC induced magnetic field-receiving means of the tag 16, the tag control means determines that the safety harness 10 is located within the high-place work area (a worker wearing the safety harness 10 is located within the high-place work area). In this embodiment, the tag 16 is operable to issue a warning when the AC induced magnetic field-receiving means receives an AC induced magnetic field, and further the magnetic sensor detects a magnetism. In other words, the tag 16 is operable to issue a warning only when the AC induced magnetic field-receiving means receives an AC induced magnetic field (a worker wearing the safety harness 10 is located within the high-place work area) under the condition that the magnetic sensor detects a magnetism (the hook 13 is attached to the hook holder 14).

In this embodiment, the warning is issued from the warning means of the tag 16 in the form of sound and from the display means in the form of light. In addition, a warning signal of the warning is transmitted via the transmitting circuit and the antenna of the tag 16 in the form of radio wave, together with a unique identification number of the rag 16. Then, when an antenna and a receiving circuit of the control device 20 receive the radio wave from the tag 16, device control means of the control device 20 is operable to cause warning means of the control device 20 to issue a warning, and further transmit information about the warning to other device such as a host computer.

As above, according to this embodiment, it becomes possible to determine whether or not the hook 13 of the safety harness 10 is used correctly, without causing complexity in the configurations of the hook 13 and the safety rope 12.

Several modifications of the above embodiment will be shown below.

Modification (1)

Figure 6:
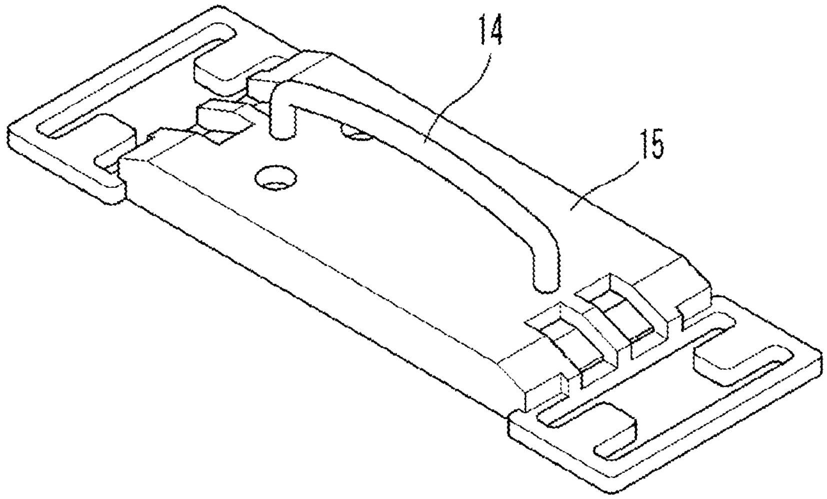
FIG. 6 is a perspective view showing another configuration of the hook holder section.

In the above embodiment, the hook holder 14 is formed in the configuration as illustrated in FIG. 2. Alternatively, the hook holder 14 may be formed in, e.g., a configuration as illustrated in FIG. 6.

Further, in the above embodiment, the hook holder 14 is incorporated in the hook holder section 15. Alternatively, the hook holder 14 may be formed independently. In this case, the tag 16 may be installed adjacent to the hook holder 14 separately.

Modification (2)

In the above embodiment, the means to detect whether or not the hook 13 is attached to the hook holder 14 comprises the magnet 17 mounted to the hook 13, and the magnet sensor installed adjacent to the hook holder 14 to serve as means to detect a magnetism of the magnet 17. Alternatively, the means to detect whether or not the hook 13 is attached to the hook holder 14 may comprise a current supply to supply a minute electric current to the hook holder 14, and a sensor installed adjacent to the hook holder 14 to serve as means to detect the current.

Since the hook 15 is generally made of metal, the amount of current flowing through the hook holder 14 varies depending on whether or not the hook 13 is attached to the hook holder 14. Thus, when the current amount detected by the means to detect the current corresponds to that to be detected when the hook 13 is attached to the hook holder 14, it can be determined that the hook 13 is attached to the hook holder 14. As the means to detect the current in the modification (2), the magnetic sensor in the rag 16 illustrated in FIG. 4 may be replaced with a current sensor or ammeter.

Modification (3)

In the above embodiment, a high-place work area is defined by an AC induced magnetic field. Alternatively, a high-place work area may be defined by, e.g., a radio wave, instead of an AC induced magnetic field. In this case, the AC induced magnetic field-transmitting means of the control device 20 illustrated in FIG. 5 may be replaced with radio wave-transmitting means, and further the AC induced magnetic field-receiving means of the tag 16 illustrated in FIG. 4 may be replaced with radio wave-receiving means.

In a case where a high-place work area covers a wide range, the control device 20 (AC induced magnetic field-transmitting means or radio wave-transmitting means) may be installed plurally.

LIST OF REFERENCE SIGNS

10: safety harness
11: belt
12: safety rope
13: hook
14: hook holder
15: hook holder section
16: tag
17: magnet
20: control device

The invention claimed is:

1. A system for confirming a hooking state of a safety harness, wherein the safety harness comprises: a belt to be worn on a body of a worker; a safety rope connected to the belt; a hook attached to a distal end of the safety rope; and a hook holder for allowing the hook to be attached to the belt therethrough, wherein the system comprises a control device comprising AC induced magnetic field-transmitting means to transmit an AC induced magnetic field so as to define a high-place work area in which a worker wearing the safety harness is to conduct work, the system being operable to detect whether or not the hook is attached to the hook holder, and whether or not the safety harness is located within a detection range of the AC induced magnetic field, and issue a warning when it is detected that the hook is attached to the hook holder, and the safety harness is located within the detection range of the AC induced magnetic field, wherein the system comprises a magnet mounted to the hook, and a tag installed adjacent to the hook holder, wherein the tag comprises: a magnetic sensor to detect a magnetism of the magnet to, in cooperation with the magnet, serve as means to detect whether or not the hook is attached to the hook holder; AC induced magnetic field-receiving means to receive the AC induced magnetic field to, in cooperation with the control device, serve as means to detect whether or not the safety harness is located within the detection range of the AC induced magnetic field; and warning means, the tag being configured to output a warning when the AC induced magnetic field-receiving means receives the AC induced magnetic field, and the magnetic sensor detects the magnetism.

* * * * *